US00RE34586E

United States Patent [19]

Spink et al.

[11] E Patent Number: Re. 34,586

[45] Reissued Date of Patent: Apr. 19, 1994

[54] SPRAY NOZZLE DESIGN

[75] Inventors: Donald R. Spink; Edward F. Spink, both of Waterloo, Canada

[73] Assignee: Turbotak Inc., Waterloo, Canada

[21] Appl. No.: 729,165

[22] Filed: Jul. 12, 1991

Related U.S. Patent Documents

Reissue of:

[64] Patent No.: 4,893,752
Issued: Jan. 16, 1990
Appl. No.: 190,828
Filed: May 6, 1988

[30] Foreign Application Priority Data

May 6, 1987 [GB] United Kingdom ..... 8710685

[51] Int. Cl.[5] ..... B05B 7/04

[52] U.S. Cl. ..... 239/427.3; 239/431; 239/434

[58] Field of Search ..... 239/132.3, 427, 427.3, 239/430, 431, 434, 523

[56] References Cited

U.S. PATENT DOCUMENTS

| | | | |
|---|---|---|---|
| 1,062,714 | 5/1913 | Johnston | 239/427 |
| 1,276,214 | 8/1918 | Harris | 239/431 |
| 2,613,737 | 10/1952 | Schweitert | 239/431 |
| 2,854,285 | 9/1958 | Barton | 239/434 |
| 2,933,259 | 4/1960 | Raskin | 239/431 |
| 3,232,542 | 2/1966 | Colin-Smith | 239/427.3 |
| 3,421,693 | 1/1969 | Fraser | 239/434 |
| 3,829,015 | 8/1974 | Monro | 239/430 |
| 4,141,505 | 2/1979 | Reich | 239/431 |
| 4,356,970 | 11/1982 | Vosper et al. | 239/427.3 |
| 4,601,428 | 7/1986 | Kurogo | 239/427.3 |
| 4,708,293 | 11/1987 | Graziadio | 239/427 |
| 4,784,321 | 11/1988 | Delaplace | 239/427 |

*Primary Examiner*—Andres Kashnikow
*Assistant Examiner*—Lesley D. Morris
*Attorney, Agent, or Firm*—Sim & McBurney

[57] ABSTRACT

Novel nozzle designs useful for forming atomized sprays of fine liquid droplets in a continuous gas phase or fine gas bubbles in a continuous liquid phase, for a variety of purposes, are described. In one embodiment, the nozzle comprises a multiple number of orifices communicating with a single source of both liquid and gas, usually air, to spray in different directions away from the nozzle. In another embodiment, both gas and liquid feeds to the nozzle are effected at the same end, opposite to a single spray orifice or a multiple number of spray orifices. Also described are a plurality of designs for replaceable orifices.

5 Claims, 6 Drawing Sheets

12C
12C
518
514
510
514
512
516
626
628
624
616
610
618
622
614
620
612

SPRAY NOZZLE DESIGN

Matter enclosed in heavy brackets [ ] appears in the original patent but forms no part of this reissue specification; matter printed in italics indicates the additions made by reissue.

FIELD OF INVENTION

The present invention relates to spray nozzles which produce an atomized liquid spray.

BACKGROUND TO THE INVENTION

In German Pat. No. 2,627,880, there is described a nozzle design for forming atomized sprays in which a gas medium and a liquid medium are combined in a mixing chamber and then expelled from the nozzle as atomized liquid or as tiny gas bubbles, depending on the relative proportions of the liquid and gas. The atomization results from a considerable drop in pressure as the two-phase mixture leaves the nozzle. The nozzle is based on the principle that a property-formed two-phase mixture has an effective sonic velocity that is less than the sonic velocity of either the gas stream alone or liquid stream alone, estimated to be as low as 10 percent of the sonic velocity of water. This nozzle design has many attributes, including lower pressures, lower pressure drop, reduced velocities, reduced air consumption and reduced orifice abrasion.

However, the nozzle consists of a single orifice which has many shortcomings. For example, if a large duct is to be completely filled with fine liquid spray, the 12° to 15° spray angle generated by the single orifice may require placement of the nozzle many meters back in the duct or the use of a multiple number of individual nozzles to achieve the objective.

In the nozzle design described in the above-noted German Patent, the liquid feed is effected through the same pipe as the spray is ejected from, while the gas is fed from the side to a chamber which surrounds and communicates with the liquid feed through a plurality of openings in the liquid feed pipe just upstream of the orifice, so as to form the two-phase mixture. This feed arrangement often is unsuitable for the feed lines available and the intended end use.

SUMMARY OF INVENTION

In accordance with one aspect of the present invention, there is provided a novel nozzle design wherein a multiple number of orifices communicate with a single source of both liquid and gas and are arranged to spray in different directions away from the nozzle. Such multiple orifice nozzles are sometimes referred to herein as "cluster nozzles".

In accordance with another aspect of the present invention, there is provided another novel nozzle design in which the feeds of gas and liquid are both effected to the rear of the nozzle, either as separate feeds or coaxial feeds.

The present invention also includes, as another aspect thereof, a plurality of designs for replaceable orifices for use with the novel nozzle designs of the invention and the nozzle design disclosed in the aforementioned German patent.

The nozzles described herein are useful for a variety of applications where fine liquid droplets or fine gas bubbles are required. The nozzles may be employed with a variety of scrubbing devices, for example, in conjunction with the so-called "Waterloo Scrubber", described in U.S. Pat. No. 4,067,703, disclosure of which is incorporated herein by reference.

DESCRIPTION OF PREFERRED EMBODIMENTS

Figure 1:
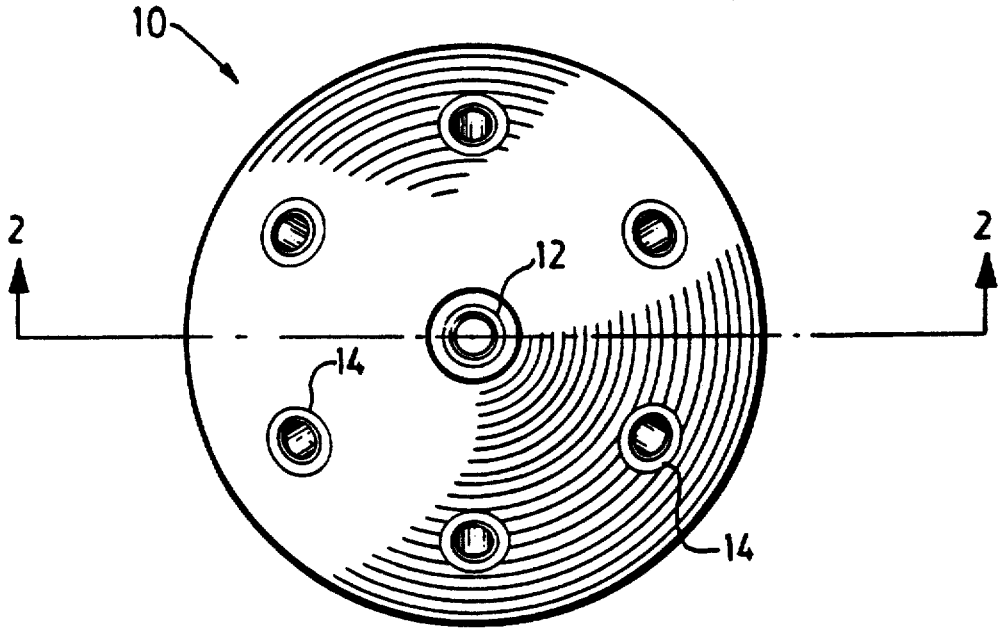
FIG. 1. PRIOR ART
FIG. 1 is a plan view of a nozzle design in accordance with the [one embodiment of the invention:] *the prior art;*
Figure 2:
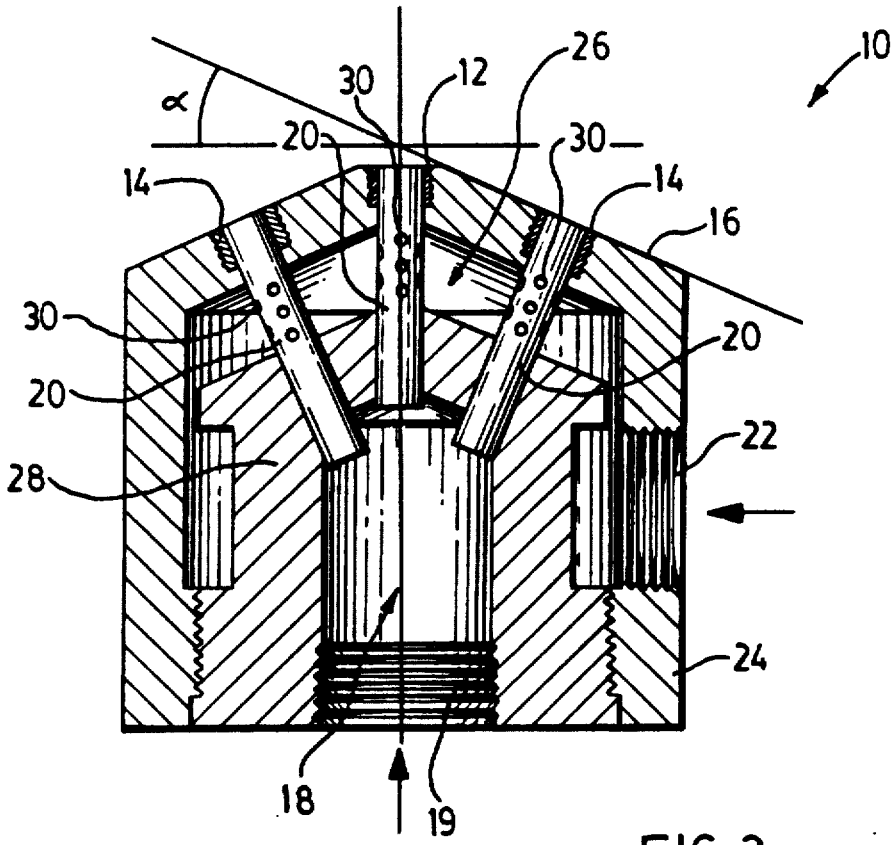
FIG. 2. PRIOR ART
FIG. 2 is a sectional view taken on line 2—2 of FIG. 1.

Referring first to FIGS. 1 and 2, there is illustrated therein [one embodiment of] a multiple orifice cylindrical nozzle 10 according to the [invention] *prior art. As may be seen, the nozzle 10 has a central orifice 12 and a plurality of orifices 14 arranged in a circular pattern around the central orifice 12.*

The nozzle 10 has a tapered end wall 16, arranged at a variable angle $\alpha$ to a line drawn perpendicular to the axis of the nozzle 10 so that the orifices 14 are arranged to spray away from the axis of the nozzle 10 while the orifice 12 sprays along that axis. In this way, a much wider spray can be provided from the single nozzle 10 than is possible with the single orifice design of the German Patent. The angle $\alpha$ can be varied to provide the desired spray angle.

The nozzle 10 has an interior axial chamber 18 which is intended to be connected to a liquid flow line through liquid inlet 19 in the bottom wall of the nozzle 10. Each of the orifices 12,14 is connected to the chamber 18 by an individual pipe 20 to permit flow of liquid from the chamber 18 to the respective orifices 12 and 14.

As air or other gas inlet 22 is provided in the side wall 24 in communication with a second internal chamber 26 which is separated from the axial chamber 18 by an internal wall 28, which is a body part threadedly engaged or otherwise joined to the outer wall 24 of the nozzle 10. The chamber 26 communicates with the interior of the piper 22 through a plurality of openings 30 extending through the wall of each of the pipes 20. For this reason, the pipes 20 may be considered as air or gas distributors.

In operation, the liquid passing through the pipes 20 from the chamber 18 mixes with gas passing from the chamber 26 through the openings 30 to form a two-phase mixture in the pipe 20. As the mixture exits the nozzle 10 through the orifices 12,14, the sudden change in pressure causes atomization to form fine liquid droplets in a continuous gaseous phase or fine gas bubbles in a continuous liquid phase, depending on the relative proportions of gas and liquid in the two-phase mixture. It is preferred to provide proportions of gas and liquid which produce a discontinuous phase of liquid droplets Further particulars of the atomization procedure are described in German Pat. No. 2,627,880, referred to above and incorporated herein by reference.

While the nozzle design illustrated in FIGS. 1 and 2 operates satisfactorily and may be the best design in certain circumstances, the nozzle 10 has certain limitations. The existence of the central axial orifice 12 produces an effect on the sprays measuring from the orifices 14 tending to draw in those sprays in towards the central orifice spray, thereby tending to decrease the effectiveness of the desired spray pattern.

In addition, the number of permitted orifices 12,14 is limited by the shape of the nozzle 10 and difficulties arise in achieving a dense homogeneous spray pattern. Thus, if the orifices are placed too close to each other, considerable spray pattern interference occurs.

Figure 3:
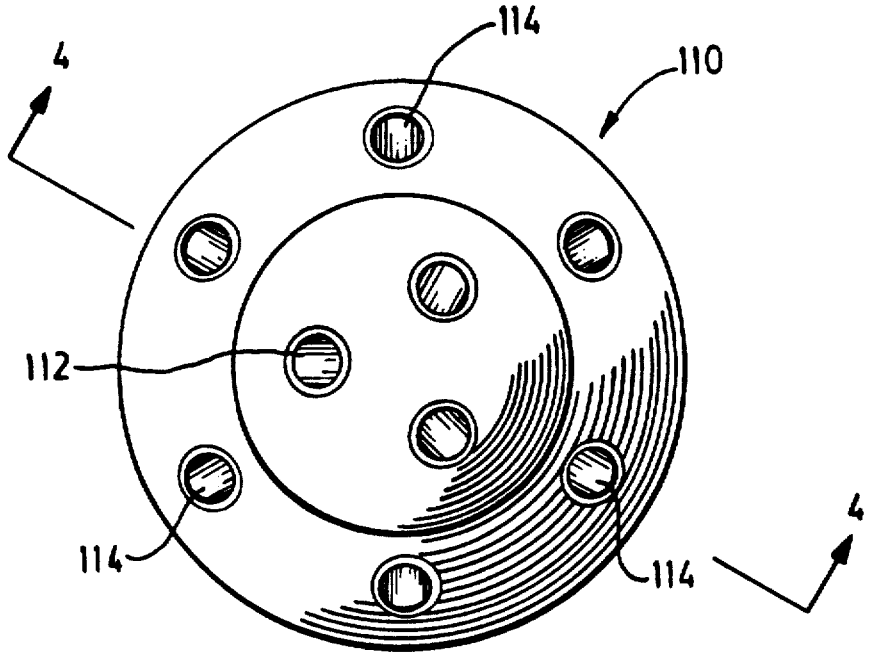
FIG. 3 is a plan view of a nozzle design in accordance with [another] *one* embodiment of the invention.
Figure 4:
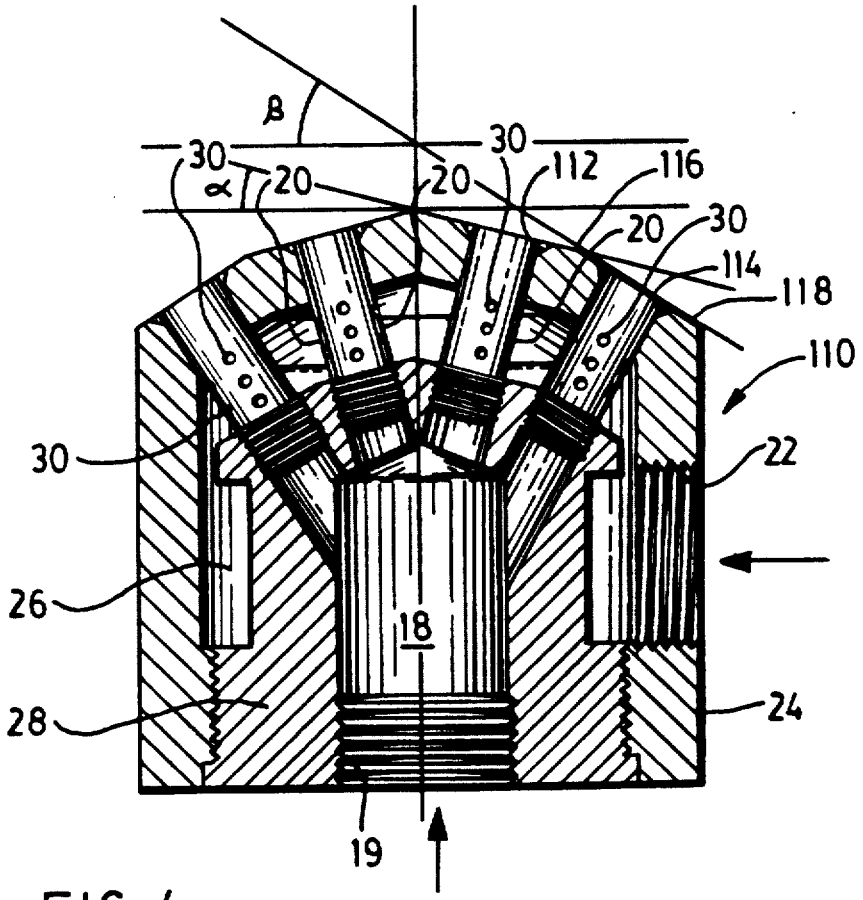
FIG. 4 is a sectional view taken on line 4—4 of FIG. 3.

For these reasons, it is more preferred to employ the nozzle 110 illustrated in FIGS. 3 and 4, which now will be described. The same reference numerals are used in these Figures to identify elements common to those identified by such reference numerals in FIGS. 1 and 2.

In nozzle 110, the central orifice 12 has been eliminated to avoid the compression effect noted above. The orifices 14 have been replaced by two circularly arranged sets of orifices 112 and 114. The inner set of orifices 112 is formed in a first tapered external surface 116 of the nozzle 110 arranged at an angle $\alpha$ to a line drawn perpendicular to the axis of the nozzle 110. The outer set of orifices 114 is formed in a second tapered external surface 118 of the nozzle 110 arranged at an angle $\beta$, greater than angle [a] $\alpha$, to a line drawn perpendicular to the axis of the nozzle 110. By providing two sets of orifices arranged at different angles, the total spray angle generated by the nozzle 110 can be varied widely while at the same time effectively eliminating spray pattern interference and lack of spray pattern uniformity.

The angle $\alpha$ generally is small so that the orifices 112 fill the center of the total spray being generated. The angle $\beta$ is designed to provide the overall spray angle desired, which may vary with nozzle 110 from about 30° to about 180°.

If a larger, more dense spray is required, a further set of orifices may be provided, say from 9 to 12 in number, arranged in the circular array on a tapered surface with a taper angle greater than angle $\beta$. The extent to which additional sets of orifices may be added to the nozzle 110 on tapered surfaces having increasing angles of taper is limited by the amount of liquid to be sprayed by a single multiple orifice nozzle.

In the nozzles [10 and] 110 illustrated in FIGS. [1] *3* to 4, individual two-phase mixtures of gas and liquid are formed in each of the individual pipes 20. This arrangement requires a significant amount of precision machining, which can lead to an expensive construction. For example, after the insert 28 is assembled with he outer wall 24, the openings for each orifice 112,114 are precision drilled and the internal wall is thread tapped to enable the pipes 20 to be secured in place.

Figure 5:
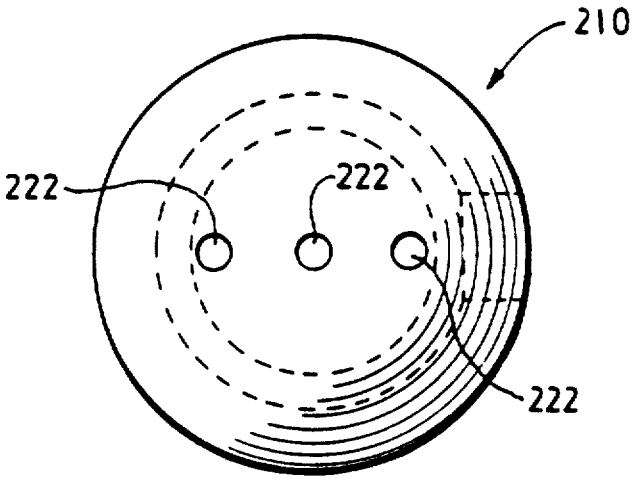
FIG. 5 is a plan view of a nozzle design in accordance with a further embodiment of the invention.
Figure 6:
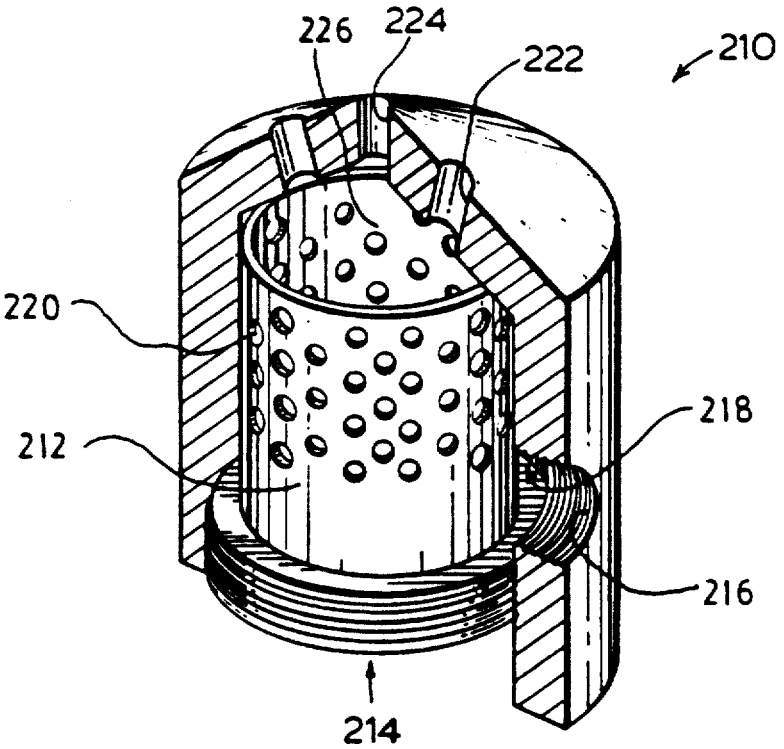
FIG. 6 is a perspective view of the nozzle of FIG. 5, partly broken away to show the detail of the construction.

A simpler, less expensive nozzle design is illustrated in FIGS. 5 and 6 and now will be described. In nozzle 210, a single two-phase mixture is formed in a pipe or air distributor 212 from liquid fed to a liquid inlet 214 and gas fed to side gas inlet 216 which communicates with a chamber 218 formed between the internal wall of the nozzle 210 and the pipe 212. The gas chamber 218 communicates with the interior of the pipe 212 to mix with the liquid therein through a series of openings 220 formed through the wall of the pipe 212.

In the illustrated embodiment, three orifices 222 are provided extending through the end wall 224 of the nozzle 210 to communicate with a chamber 226 provided at the downstream end of the pipe 212, so that a common two-phase mixture is provided to each of the orifices 222. A central axially-arranged orifice and two other orifices are provided on opposite sides of and equidistant from the central orifice on a tapered surface. The arrangement of three orifices 222 enables a flat spray pattern to be produced from the nozzle 210. A circular flat spray also may be produced by providing an elongate sot in a raised radius in place of the orifices 222.

The number, location and arrangement of orifices and tapered surfaces can be varied to suit the end-use requirements of the nozzle, while retaining the concept of a single air distributor for the orifices, as is clear from the arrangements illustrated in and the discussion with respect to FIGS. [1] *3* to 4.

In all the embodiments of FIGS. [1] *3* to 6, the various orifices have been illustrated as having the same diameter, although variable-diameter orifices may be provided as required.

The provision of the single mixing chamber in the embodiment of FIGS. 5 and 6 leads to a more inexpensive structure than that illustrated in FIGS. [1] *3* to 4, since the precision machining operations required for the latter structures are eliminated. Further advantages observed for the embodiment of FIGS. 5 and 6 are the production of a denser spray pattern and the ability to produce readily a variety of spray patterns, including fan-shaped, hollow cone or wide angle, by varying the number and location of the orifices. In addition, the single mixing chamber is more efficient and less prone to plugging when spraying particulate slurries, thixotropic mixtures and fibrous slurries In the single orifice design of the above-noted German patent, there is a specific relationship between the openings in the air distributor and the size of the orifice openings, as described therein. This relationship is retained for each individual mixing pipe 20 in the structures in FIGS. [1] *3* to 4. For cluster nozzles which contain a single air distributor, as in FIGS. 5 and 6, the same relationship again is maintained, in this case in terms of total area of the air openings 220 to the total area of the orifices 222.

As the diameter of the nozzle 210 increases, it becomes more difficult to achieve a complete two-phase mixture entering the orifices 222. In such cases, it is preferred to employ a longer air distributor 212 to contain a significantly greater number of distributor openings 220, albeit of smaller diameter to retain the desired relationship. By extending the length of the pipe, the residence time of gas and liquid in the pipe 212 is increased sufficiently to permit intimate mixing of gas and liquid, to form the desired two-phase mixture. In place of an air distributor 212, properly designed and applied static mixers may be used to form two-phase liquid and gas mixtures.

The nozzles of the present invention may be employed to atomize a variety of liquids, which also may contain solids and hence are in the form of slurries, using a variety of gases, usually air. The presence of significant amounts of solids in the liquid being atomized would normally be expected to produce severe erosion of the orifices, especially at the sonic or near sonic velocities commonly employed. However, such erosion is not observed and this result is thought to arise from compression of he slurry within an air envelope as the two-phase mixture passes through the orifices, thereby preventing direct contact between the slurry and the walls of the orifice.

Figure 7A:
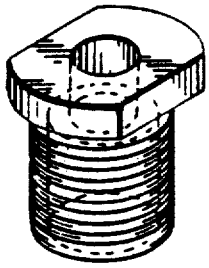
FIGS. 7a, 7b and 7c illustrates a number of different replaceable nozzle insert designs for use with the nozzles of the invention.
Figure 7B:
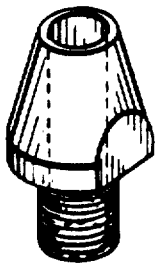
Figure 7C:
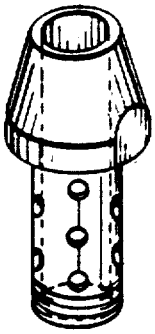

Nevertheless, where long, maintenance-free use of the nozzle is required, replaceable orifice inserts constructed of especially hardened materials may be employed. Such orifice inserts may take a variety of forms, depending on the use to which the orifice insert is to be put, and several examples of such orifice inserts are illustrated in FIGS. 7a, 7b and 7c. In the case of FIG. 7c, it will be seen that the replaceable insert includes the air distributor and hence is suited for use with the embodiments of FIGS. [1] *3* to 4. This replaceable insert may be formed of hardened steel with sharpened edges to eliminate build up of lime at the discharge end of the nozzle when spraying lime slurry.

In each of the nozzle designs illustrated in FIGS. [1] *3* to 6 and also in the aforesaid German patent, the gas enters the nozzle through a side opening in the device. This arrangement may be inconvenient in certain applications, for example, when the nozzle needs to be positioned at the end of a lance. One design of lance is shown in FIG. 12.

Figure 8:
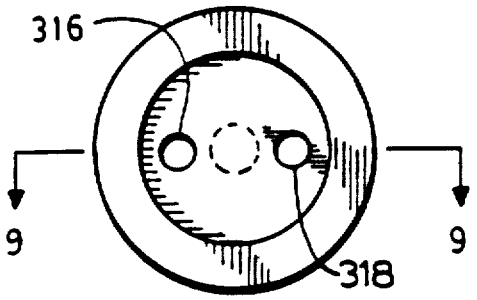
FIG. 8 is a plan view from below of a nozzle having an air inlet at the bottom, rather than at the side, in accordance with a yet further embodiment of the invention.
Figure 9:
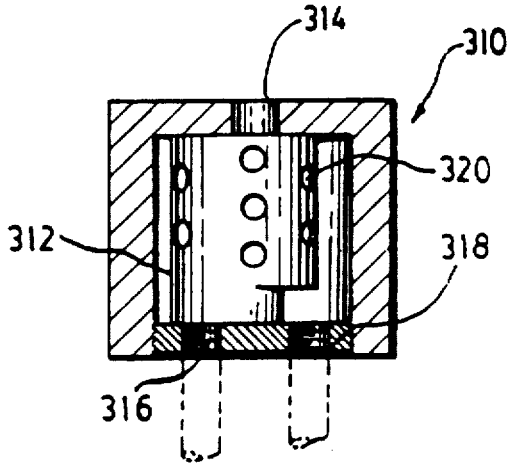
FIG. 9 is a sectional view taken on line 9—9 of FIG. 8.

In FIGS. 8 to 11, two designs of nozzle suitable for utilization in connection with a lance are illustrated. In these designs, both the liquid and gas inlets are provided at the rear of the nozzle. In FIGS. 8 and 9, a nozzle 310 has an interior gas distributor 312 communicating with a single outlet orifice 314. The interior of the gas distributor 312 communicates with a liquid inlet 316 while the exterior of the gas distributor 312 communicates with a gas inlet 318, both inlets 316 and 318 being located at the opposite end of the nozzle 310 from the outlet orifice 314. Gas passes from the exterior of the gas distributor 312 through openings 320 to mix with the liquid, as described above for the embodiments of FIGS. [1] *3* to 6. The arrangement shown in FIGS. 8 and 9 is convenient where liquid and gas feed to the nozzle is by separate feed lines.

Figure 10:
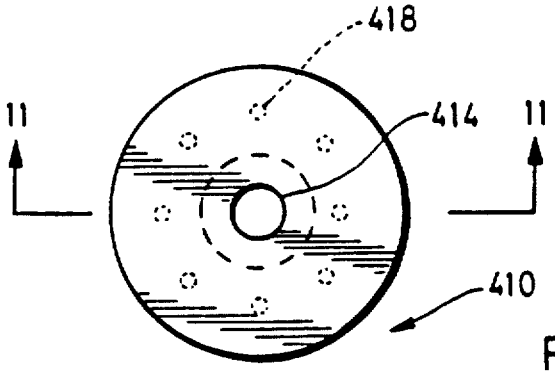
FIG. 10 is a plan view of another form of nozzle having an air inlet at the bottom, in accordance with an additional embodiment of the invention.
Figure 11:
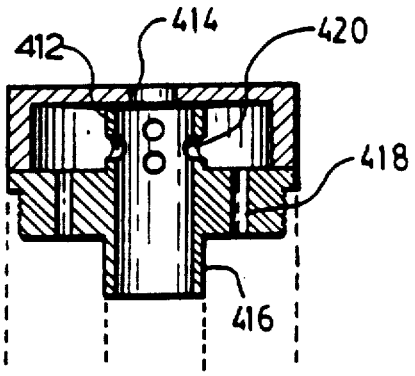
FIG. 11 is a sectional view taken on line 11—11 of FIG. 10.

The embodiment of FIGS. 10 and 11 is suitable for coaxial conduits feeding gas (outside) and liquid (inside) to the nozzle. (See also FIG. 12, described below). In nozzle 410, a gas distributor 412 communicates at its downstream end with a single outlet orifice 414. The interior of the gas distributor 412 communicates with a liquid inlet 416 which is connected to the inner conduit of the coaxial feed while the exterior of the gas distributor 412 communicates with a plurality of gas inlets 418. The nozzle 410 is connected to the coaxial pipe so that the outer portion of the pipe feeds the gas inlets 418. Gas passes from the exterior of the gas distributor 412 through openings 420 to mix with the liquid, as described above for the embodiment of FIGS. [1] *3* to 6.

The embodiments of FIGS. 8 to 11 have been described with respect to a single outlet orifice. The principle thereof, however, may be applied to nozzles having multiple numbers of outlet orifices, such as those nozzles described above with respect to FIGS. [1] *3* to 6.

Referring now to FIG. 12, there is shown therein a lance 510 of narrow design comprising an elongate coaxial structure in which liquid is conveyed by an inner conduit 512 from a liquid inlet 514. The inner conduit 512 is surrounded by an annular gas flow conduit 514 which communicates with an air inlet 516. An atomized spray is sprayed from an orifice 518 and the downstream end of the lance 510. Air and liquid mixing occurs immediately upstream of the orifice 518, in a manner as described above for the embodiment of FIGS. 10 and 11. One utility for the lance 510 is for the introduction of liquid catalyst to an oil cracking operation.

Figures 12A, 12B, 12C, 13:
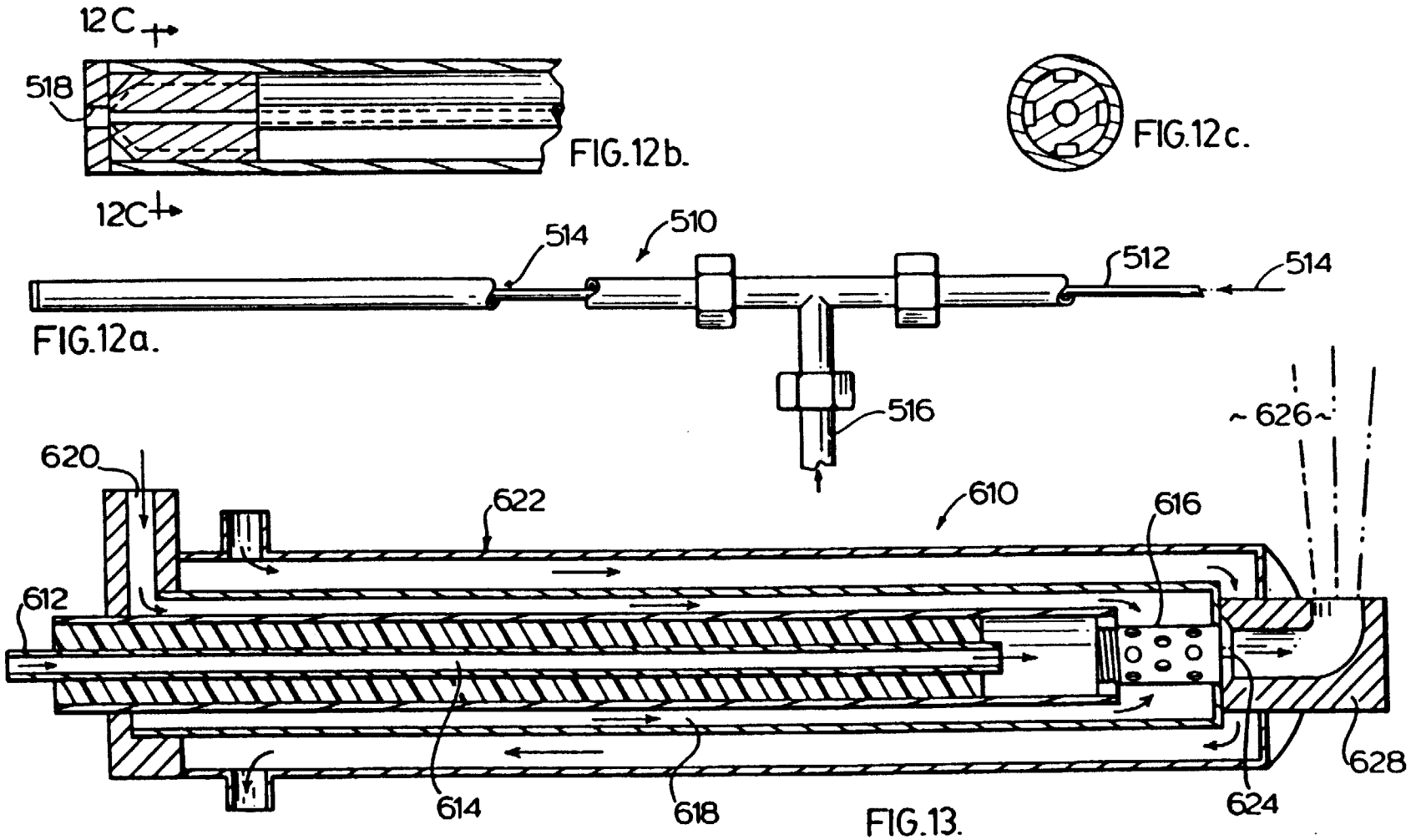
FIGS. 12a-12c a schematic illustration of a nozzle configured as a lance including a sectional view along line A—A; in accordance with a further embodiment of the invention.
FIG. 13 is a schematic sectional view of a nozzle according to one embodiment of the invention for spraying slurry into a hot environment.

FIG. 13 illustrates a special form of lance-type nozzle specifically designed for the spray of slurry into a hot environment, such as the spraying of line into a coal-fired power station heat generator. The nozzle 610 has a slurry inlet 612 attached to a central slurry feed pipe 614 which communicates at its downstream end with an air distributor 616. The air distributor 616 also communicates with a concentric annular air feed pipe 618 which communicates at its upstream end with an air inlet 620. The concentric arrangement of slurry and air feed pipes is surrounded by a water jacket 622 to cool and protect the feed pipes. The atomized slurry, formed as described previously, emanates from an orifice 624 at the downstream end of the air distributor 616 and is directed into the gas space 626 of the furnace at right angles to the axis of the nozzle 610 by a guide element 620.

Generally, in nozzles of the type described herein, the orifice length-to-diameter ratio is 1.5. However, this ratio can be varied to obtain special effects. For example, if the length of the orifice is decreased, a slightly larger but more uniform droplet size distribution results, which is useful when using the nozzle to spray slurries in a spray drier.

SUMMARY OF DISCLOSURE

In a summary of this disclosure, the present invention provides novel spray nozzle structures which have useful and unique applications. Modifications are possible within the scope of the invention.

What we claim is:

1. A nozzle for the formation of an atomized spray of fine liquid droplets in a continuous gaseous phase or of fine gas bubbles in a continuous liquid phase, *said nozzle having a longitudinal axis,* which comprises:

first chamber means for communicating with a source of liquid, second chamber means for communicating with a source of gas, a plurality of individual cylindrical mixing chamber means *each defined by a peripheral wall and* communicating with said first and second chamber means *at an upstream longitudinal end thereof and with said second chamber means through said peripheral wall* for mixing said gas and liquid to form a two-phase mixture of said gas and liquid in each of said individual cylindrical mixing chamber means for ejection from said nozzle, and a plurality of cylindrical orifice means immediately downstream of, of the same diameter as and communicating with said plurality of individual cylindrical mixing chamber means with each combination of cylindrical orifice means and cylindrical mixing chamber means being arranged at a different angle with respect to each other *and to said longitudinal axis* for ejection of said two-phase mixture from each said individual mixing chamber to form said atomized spray.

2. [The nozzle of claim 1] *A nozzle for the formation of an atomized spray of fine liquid droplets in a continuous gaseous phase or of fine gas bubbles in a continuous liquid phase, said nozzle having a longitudinal axis, which comprises:*

*first chamber means for communicating with a source of liquid,*

*second chamber means for communicating with a source of gas,*

*a plurality of individual cylindrical mixing chamber means each defined by a peripheral wall and communicating with said first chamber means for mixing said gas and liquid to form a two-phase mixture of said gas and liquid in each of said individual cylindrical mixing chamber means for ejection from said nozzle, and*

*a plurality of cylindrical orifice means immediately downstream of, of the same diameter as and communicating with said plurality of individual cylindrical mixing chamber means with each combination of cylindrical orifice means and cylindrical mixing chamber means being arranged at a different angle with respect to each other and to said longitudinal axis for ejection of said two-phase mixture from each said individual mixing chamber to form said atomized spray,* wherein said nozzle is of cylindrical shape and said plurality of orifice means comprises a first plurality of orifice means arranged in a first circle about [the] *said longitudinal* axis of the nozzle on a first surface tapering to the axis at a first angle to a line drawn perpendicular to the axis of the nozzle and a second plurality of orifice means arranged in a second circle about the axis of the nozzle wider than said first circle on a second surface tapering to the axis at a second angle to a line drawn perpendicular to the axis of the nozzle greater than said first angle.

3. [The nozzle of claim 1] *A nozzle for the formation of an atomized spray of fine liquid droplets in a continuous gaseous phase or of fine gas bubbles in a continuous liquid phase, said nozzle having a longitudinal axis, which comprises:*

*first chamber means for communicating with a source of liquid,*

*second chamber means for communicating with a source of gas,*

*a plurality of individual cylindrical mixing chamber means each defined by a peripheral wall and communicating with said first chamber means for mixing said gas and liquid to form a two-phase mixture of said gas and liquid in each of said individual cylindrical mixing chamber means for ejection from said nozzle, and*

*a plurality of cylindrical orifice means immediately downstream of, of the same diameter as and communicating with said plurality of individual cylindrical mixing chamber means with each combination of cylindrical orifice means and cylindrical mixing chamber means being arranged at a different angle with respect to each other and to said longitudinal axis for ejection of said two-phase mixture from each said individual mixing chamber to form said atomized spray,* wherein said plurality of individual chamber means is formed in pipes extending from a single common first chamber means having an inlet for liquid substantially at an end opposite to said orifice means through a common single second chamber means having an inlet for gas in a side wall of said nozzle means to said plurality of orifices, and said mixing chamber means communicates with said second chamber means to permit gas to enter the pipe and mix with liquid from said first chamber means by a plurality of openings formed through the wall of said pipe.

4. The nozzle of claim 1 wherein each of said plurality of orifice means is in the form of [a] circular [opening] *openings* of the same diameter.

5. [The nozzle of claim 1] *A nozzle for the formation of an atomized spray of fine liquid droplets in a continuous gaseous phase or of fine gas bubbles in a continuous liquid phase, said nozzle having a longitudinal axis, which comprises:*

*first chamber means for communicating with a source of liquid,*

*second chamber means for communicating with a source of gas,*

*a plurality of individual cylindrical mixing chamber means each defined by a peripheral wall and communicating with said first chamber means for mixing said gas and liquid to form a two-phase mixture of said gas and liquid in each of said individual cylindrical mixing chamber means for ejection from said nozzle, and*

*a plurality of cylindrical orifice means immediately downstream of, of the same diameter as and communicating with said plurality of individual cylindrical mixing chamber means with each combination of cylindrical orifice means and cylindrical mixing chamber means being arranged at a different angle with respect to each other and to said longitudinal axis for ejection of said two-phase mixture from each said individual mixing chamber to form said atomized spray,* wherein each of said plurality of orifice means includes a replaceable orifice insert.

* * * * *